Nov. 29, 1938.    E. F. ROSSMAN ET AL    2,138,513
SHOCK ABSORBER
Filed July 29, 1937    2 Sheets-Sheet 2

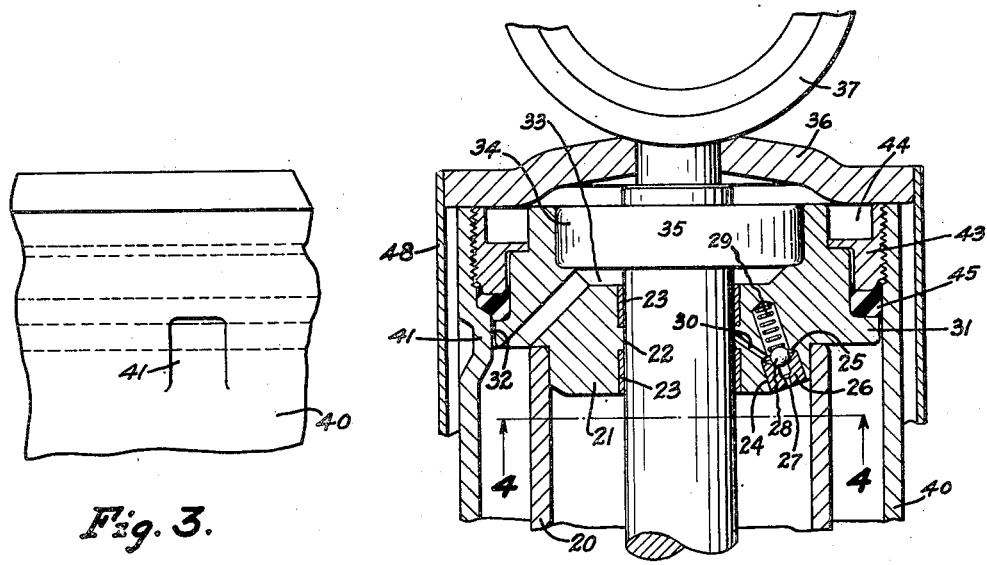
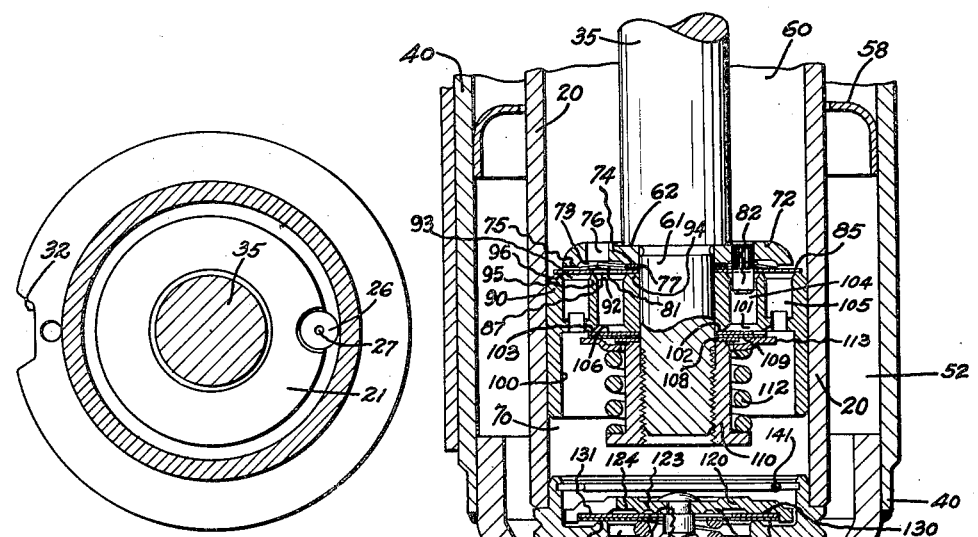
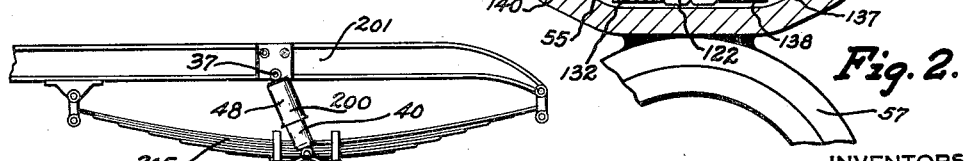

INVENTORS
EDWIN F. ROSSMAN AND
FREDERICK D. FUNSTON
BY
Spencer, Hardman and Fehr
ATTORNEYS Patented Nov. 29, 1938

2,138,513

UNITED STATES PATENT OFFICE 2,138,513

SHOCK ABSORBER

Edwin F. Rossman and Frederick D. Funston, Dayton, Ohio, assignors to General Motors Corporation, Detroit, Mich., a corporation of Delaware Application July 29, 1937, Serial No. 156,275

12 Claims. (Cl. 188—88)

This invention relates to improvements in hydraulic shock absorbers.

It is among the objects of the present invention to provide a hydraulic shock absorber capable of controlling both the approaching and separating movements of two relatively movable members.

Another object of the present invention is to provide a hydraulic shock absorber of the direct-acting type, one portion of which is directly attached to one of said relatively movable members and another portion to the other of said relatively movable members, thereby eliminating connecting links and arms necessary in other types of well-known shock absorbers.

A further object of the present invention is to provide a direct-acting type hydraulic shock absorber with quiet functioning fluid flow control devices of simple structure and design.

Further objects and advantages of the present invention will be apparent from the following description, reference being had to the accompanying drawings, wherein a preferred embodiment of one form of the present invention is clearly shown.

In the drawings:

Fig. 1 is a fragmentary side view of a vehicle chassis with wheels removed, a shock absorber embodying the features of the present invention being shown applied thereto.

Fig. 2 is a longitudinal sectional view of the shock absorber on an enlarged scale, a portion of the shock absorber being shown broken away.

Fig. 3 is a fragmentary view showing a feature for properly locating relative parts of the shock absorber during assembling.

Fig. 4 is a fragmentary sectional view taken along the line 4—4 of Fig. 2.

Figure 5:
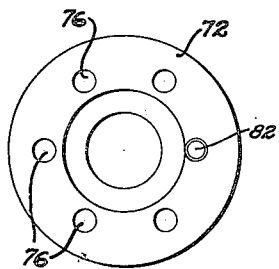
Figs. 5, 6, 7, 8, 9 and 10 are detail views illustrating the piston of the shock absorber and its fluid flow control devices.
Figure 9:
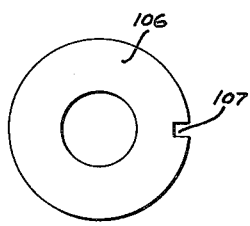
Figure 6:
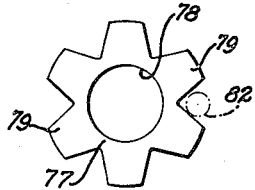
Figure 10:
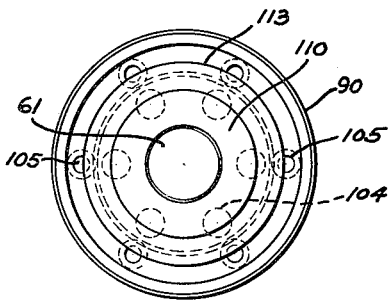
Figure 7:
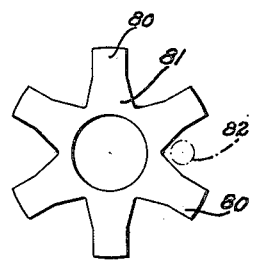
Figure 8:
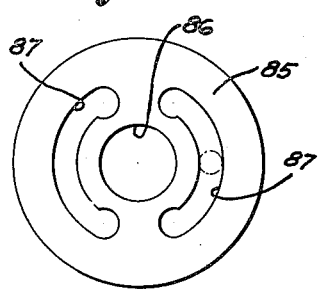

More specifically, Fig. 5 is a plan view of the backing plate for the shock absorber piston; Fig. 6 is a plan view of one of the resilient backing elements of a fluid flow control device of the piston; Fig. 7 a plan view of a second resilient backing element for a fluid flow control device of the piston; Fig. 8 a plan view of the flat and flexible fluid flow control device or valve-disc of the piston; Fig. 9 a plan view of another of the flat and flexible fluid flow control devices or valve discs of the piston; Fig. 10 an inverted plan view of the piston assembly.

Figure 11:
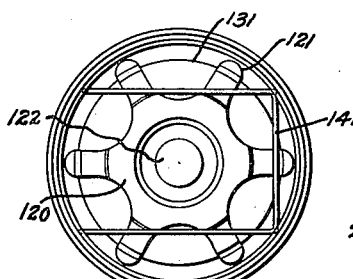

Fig. 11 is a plan view of a fluid flow control device provided at the bottom of the working cylinder.

Figure 12:
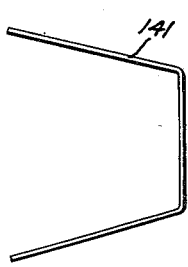

Fig. 12 is a detail view of the spring clip for limiting the movement of the fluid flow control device in one direction at the bottom of the working cylinder.

Figure 13:
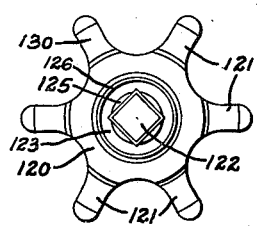

Fig. 13 is a plan view of the spider-shaped backing plate of the cylinder fluid flow control device.

Figure 14:
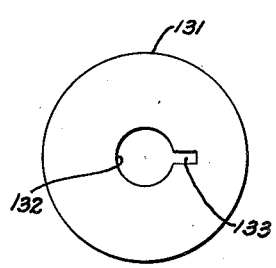

Fig. 14 is a flat and flexible valve disc of said device.

Figure 15:
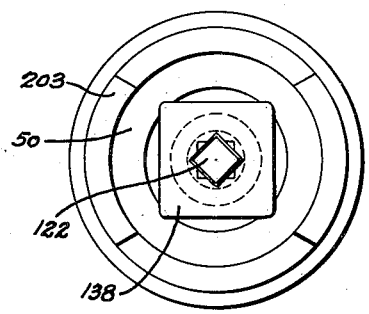

Fig. 15 is an inverted plan view of the said fluid flow control device provided at the lower end of the working cylinder.

As has been stated, this invention relates to a hydraulic shock absorber of the direct-acting type. Such a shock absorber differs from the ordinary type in that one portion thereof, in this instance a tubular member, is directly connected to one of the relatively movable members whose movement it is adapted to control, while another portion, the rod of the piston of the shock absorber, is directly connected to the other of the two relatively movable members.

The shock absorber comprises a working cylinder or tubular member 20, one end of which fits about a head or closure member 21 having an opening 22 coaxial of the tubular member 20, in which opening are provided two bearing rings 23. This closure member 21 has a recess 24, opening into the cylinder as shown in the Fig. 2 and presenting a shoulder 25 which acts as an abutment member for the insert 26 having a restricted central orifice 27 communicating with the interior of the recess, said recess 26 providing a seat for the ball check-valve 28 which is urged against this seat by a spring 29 within the recess. The portion of the recess behind the ball check-valve 28 is in communication with the opening 22 through a duct 30.

Closure member 21 has an outwardly extending annular flange 31 in which a notch 32 is provided in predetermined position relative to the recess containing the ball check-valve 28. More specifically, this recess 32 is preferably diametrically opposite the ball check-valve 28 in the closure member 21. Another recess 33 in the closure member 21, coaxial of the opening 22, is adapted to receive a packing 34, which packing snugly fits about a shaft 35 slidably extending through the opening 22 of the closure member 21. This shaft 35 may be termed the piston shaft, the outer end of which extends outside the shock absorber having an annular disc 36 and a ring-shaped mounting or attachment member 37 secured thereto in any suitable manner, preferably by welding.

Another tubular member 40 is secured to the closure member 21 in spaced relation relative to the tubular working cylinder 20 inasmuch as this tubular member 40 fits about the annular flange 31 of the said closure member. The tubular member 40 has a hump 41 provided thereon which is adapted to be received by the recess 32 provided on the closure member 21 so that the tubular member 40 may be located properly relatively to the check-valve 28 in the closure member for purposes to be described detailedly hereinafter.

The upper end of the tubular member 40 is interiorly threaded to receive the clamping ring 43 notched as at 44 for receiving a spanner wrench. A packing gasket 45 of any suitable material such as rubber, cork or the like, is interposed between the clamping ring 43 and the flange 31 of the closure member 21 whereby a seal is provided to prevent fluid leaks at this point and the tubular member 40 is thus secured to the closure member 21.

The peripheral edge of the disc 36, secured to the piston 35, extends beyond the outer peripheral surface of the tubular member 40 so that another tubular member 48, whose end is attached to disc 36 is held coaxially of the tubular member 40, this tubular member 48 providing a dust-cover to protect the sliding bearing between the shaft 35 and the packing gland 34 from dirt or dust and the like.

The lower end of the working cylinder or tubular member 20 is provided with a cylinder head 50, the lower end of which engages the closure member 51 received by and securely attached to the outer tubular member 40 in any suitable manner. The annular space 52 provided between the two concentric tubular members 20 and 40 forms a fluid reservoir which is in communication with the interior of the tubular member 40 or working cylinder 20 through a port 55 in the cylinder head 50, which port has an annular surrounding ridge 56 extending upwardly into the cylinder and providing a circular valve-seat. A mounting or attachment ring 57 similar to and in alignment with the attachment member 37 at the opposite end of the shock absorber is secured to the closure member 51 in any suitable manner, preferably by welding.

The aforementioned hump 41 in the tubular member 40 has a predetermined position in said tubular member relatively to its mounting ring or member 57 so that when said hump enters the recess 32 in the closure member 21 at the upper end of the cylinder, the mounting member 57 at the lower end of the tubular member 40 will be predeterminedly located relatively to the check-valve 28. The purpose of this predetermined location will be described hereinafter.

Within the fluid reservoir 52 there is provided a baffle plate 58 at a predetermined point between the two cylinder head members, this baffle plate being perforated and acting to prevent agitation of the fluid within the reservoir, thus eliminating emulsification of the fluid with the air.

Within the working cylinder 20 there is provided a piston 90 which forms an upper displacement chamber 60 and a lower displacement chamber 70 therein. This piston is securely attached to a reduced diameter portion 61 of the piston rod 35. The reduced diameter portion of the piston rod provides a shoulder 62 thereon against which the piston assembly is clamped. The piston assembly comprises a backing plate 72 having a central aperture which fits about the reduced portion 61 of the piston rod. The lower surface of the plate 72 has an annular groove 73 defining an inner annular ridge 74 and an outer annular ridge 75. As shown in Fig. 5, this plate 72 is provided with a plurality of through-passages 76 arranged in a circular row about the piston shaft 35. Directly beneath the plate 72 there is provided a resilient disc 77 shown in plan view in Fig. 6 having a central aperture 78 adapted to fit about the reduced portion 61 of the piston rod. This resilient backing disc has a plurality of radially extending fingers 79 which are adapted to engage and rest upon similar radial fingers 80 of a second resilient disc 81 mounted on the portion 61 of the shaft directly beneath the disc 77. In order that the fingers 79 and 80 of the two adjacent backing discs will be held in proper superposed relation and to prevent relative movement so that the fingers of one would align with the space between the fingers of the other, a pin 82 fitted in one of the through passages 76 of the backing plate 72 projects through the space between two adjacent and superposed radial fingers of the resilient discs 77 and 81 and into a passage in the piston 90. A flat flexible disc-valve 85 is attached to the reduced diameter portion 61 of the piston shaft 35 directly beneath the resilient disc 81. This disc-valve 85 has a central aperture 86 to fit about the said shaft portion and two arcuate slots 87. The fingers 80 of the resilient disc 81 are adapted to engage the flexible disc-valve 85 adjacent its outer peripheral edge as shown in the Fig. 2 so that this disc-valve is yieldably urged by this disc as well as by its associate disc 77 upon the upper surface of the main body portion of piston 90.

An inverted plan view of the piston is shown in the Fig. 10 It has a central recess adapted to fit about the reduced diameter portion 61 of the piston rod. Two concentric annular grooves 92 and 93 define the three annular ridges 94, 95 and 96 on the upper surface of the piston 90, the ridge 94 being the inner and smaller one, the ridge 95 being the intermediate and the ridge 96 the largest and outer one. The upper surfaces of these ridges all lie in the same plane as shown in the Fig. 2 and are normally engaged by the disc-valve 85 which in itself does not exert a force causing it to engage the top of the piston surface with any appreciable pressure, but which is urged at a predetermined pressure against the piston by the resilient cooperating discs 81 and 72 clamped at their inner edges between the adjacent backing plate 72 and piston ridge 94.

The piston 90 has a recess 100 in its bottom end, the bottom surface of the recess having an annular groove 101 defining an inner, annular ridge 102 similar to the ridge 94 at the opposite end of the piston and an outer, annular ridge 103 similar to, and in substantial alignment with the upper, annular ridge or seat 95. The annular groove 92 in the upper surface of the piston and the annular groove 101 in the lower surface of the piston are in communication by a series of through-passages 104 arranged in an annular row about the piston shaft portion 61. The locating pin 82 secured to the backing plate 72 and passing between the adjacent radial fingers of the discs 77 and 81 extends into one of these piston passages 104. The outer, annular groove 93 in the top surface of the piston communicates with the recess 100 at the bottom end of the piston and exteriorly of the annular ridge 103 at this end of the piston through a series of passages 105 also arranged in an annular row in the piston body portion outside of and substantially coaxial with the annular row of passages 104. The outer surfaces of the lower ridges 102 and 103 are also in the same plane forming seats normally engaged by the flat resilient valve-disc 106 illustrated in plane view in the Fig. 9. This valve-disc may be a complete circular disc or, as shown in the drawings, it may have a slot 107 of predetermined size in its peripheral edge to provide a constant fluid flow orifice. Under certain circumstances a shock absorber will be provided with a single valve-disc at this location on the piston. However, in the present drawings a second resilient valve-disc 109 is shown directly beneath and engaging the valve-disc 106, this second valve-disc being identical with the one above it with the exception of the slot 107 which is not provided in this lower disc. A backing plate 108 fits about the reduced diameter portion 61 of the piston rod and engages the lower disc 109. This backing plate 108 is of comparatively lesser diameter than the valve-discs 106 and 109 and is clamped against the valve-disc 109 by the jam nut 110 threadedly secured to the lower end of the piston rod portion 61. This jam nut 110 thus securely clamps the entire piston assembly upon the lower end of the piston rod, urging all parts thereof upwardly toward the shoulder 62 on said rod so that the backing plate 72 engages said shoulder and the various valve-discs and resilient discs are clamped between their adjacent rigid elements. The valve-discs 106 and 109 of themselves do not exert any appreciable pressure upon the lower coaxial seats 102 and 103 when held in normal position thereon by the jam nut 110. However, they are urged upon the annular valve-seat 103 at a predetermined pressure by a spring 112 interposed between an annular flange on the jam nut 110 and a rigid pressure plate 113 surrounding the jam nut and engaging the lower peripheral surface of the lower flexible disc-valve 109.

It has been stated that the working cylinder, and particularly the displacement chamber 70 therein is in communication with the fluid reservoir 52 through the port 55 provided in the cylinder end member 50. It has also been stated that an annular valve-seat 56 surrounds this port 55 and extends upwardly into the chamber 70. A valve device of a unitary type is provided for this port and is adapted differentially to control fluid flow therethrough in opposite directions. It is adapted to provide for a substantially unrestricted flow through said port from the reservoir into the chamber 70 and a restricted flow of fluid through the port from the displacement chamber 70 back to the reservoir 52. This valve comprises a rigid backing plate 120, shown in the Figs. 11 and 13 to have a plurality of radially extending fingers 121. Depending from the disc-plate is a central stud or standard 122 secured centrally of the backing plate 120 in any suitable manner. The bottom of the backing plate has two coaxial grooves 123 and 124 forming annular ridges 125 and 126. The inner ridge 125 is centrally apertured to receive a reduced end portion of the standard or stud 122, the protruding edge of which is riveted over to secure said stud to the backing plate. The annular ridge 126 concentric to and larger in diameter than the ridge 125 provides a valve seat, the outer surface of which is in the same plane with the outer surface of the ridge 125 as shown in Fig. 2. The radially extending fingers 121 have each a flat surface 130 which are in the same plane with the outer surface of the annular ridges 126 and 125. All these surfaces 130 and outer surface of ridges 125 and 126 are normally engaged by a flat resilient disc-valve 131 centrally apertured as at 132 to clear the standard 122, this aperture, however, being smaller than the diameter of the annular valve-seat 126. In shock absorbers for certain types of automobiles only one such flat, resilient disc-valve may be used. However, in the present structure two such discs are shown, the one 131 just referred to having a notch 133 communicating with the central aperture 132, said notch providing a constant fluid leak orifice. The second disc-valve 135 is exactly like the disc-valve 131, however, not being provided with the notch 133. Both these disc-valves constantly engage each other, being flat, the disc-valve 131 normaly engages the backing plate without in itself exerting any appreciable pressure thereon. However, a comparatively heavy spring 137 is interposed between the disc-valves 131 and 135 and an abutment disc 138 detachably secured to the outer end of the standard 122, this spring yieldably urging the disc-valves against the backing plate 120. The spring engages lower disc-valve 135 adjacent its inner aperture 132. The entire valve assembly including backing plate 120 and disc-valves 131 and 135 with their standard 122 and spring 137 is normally yieldably urged upon the annular valve-seat 56, about the port 55, by a coil spring 140 which is comparatively lighter than the spring 137. This permits lifting of the valve device as a unit against the effect of spring 140 to raise the disc-valve 135 from engagement with the seat 56. In order to limit this movement of the valve unit away from seat 56, the end member 50 has a stop spring clip 141 fitting into an inner groove in the end member, this stop spring being clearly shown in the Figs. 11 and 12.

A feature of the unitary valve device resides in the provision of a disc-valve member or members, which is bodily moved with its cooperating parts to permit a substantially free flow of fluid through the port in one direction while the same disc-valve or valves are flexed by fluid pressure, about one valve-seat and away from another valve-seat, provided on one of its cooperating parts, to permit a restricted flow of fluid in another direction through the port which it controls.

Having described the structure of this improved shock absorber, its functions under various conditions will now be explained.

As has been stated, this shock absorber is adapted to control both the approaching and separating movements of two relatively movable members, for instance the frame and axle of a vehicle. The shock absorber designated as a whole by the numeral 200 is shown in Fig. 1 to be connected directly between the frame 201 and the axle 202 of the vehicle. Fig. 1 also shows that the shock absorber is inclined and not connected between these two movable members in a vertical position. Due to this inclination it is desirable to know the exact position of the air-bleed valve 28 in the head or closure member 21, and it is for this reason that the hump 41 is provided in the outer tubular member capable of being assembled only in a definite position relative to said valve, this hump thus indicating from the outside of the shock absorber where the air-bleed valve is located so that the shock absorber may be mounted in an inclined position as shown in Fig. 1 with the air-bleed valve to the top and above the normal level of the fluid within the reservoir. Thus any air, tending to accumulate in the fluid displacement chamber 60 above the piston is discharged through the orifice 27, past valve 28, thence through passage 30 into and through the space or clearance between the shaft 35 and the upper bearing ring 23 in the chamber 33.

The outer tubular member has its ring end connected to the axle as shown in Fig. 1 while the piston rod is connected to the frame of the vehicle. Now supposing that while the vehicle is being operated over a highway the road wheels strike an obstruction and are suddenly thrust upwardly toward the frame 201 of the vehicle. This moves the two concentric tubular members 20 and 40 upwardly and consequently the piston 90 will move downwardly in the cylinder 20 exerting a pressure upon the fluid within the displacement chamber 70. This fluid will escape from the chamber 70 through the outer annular row of piston passages 105, the fluid lifting the disc-valve 85 against the effect of its resilient backing members 77 and 81 to permit a substantially free flow of fluid from the chamber 70 through piston passages 105 past the valve 85 into the displacement chamber 60. Due to the presence of the piston rod 35 in the chamber 60 this chamber cannot receive all of the fluid being displaced from chamber 70 and thus pressure exerted upon the fluid in this chamber 70 will cause fluid to flow between the radial fingers 121 of the backing plate 120 through the orifice 133 in the valve-disc 131, for this orifice lies in direct alignment with the valve-seat 126 and thus provides an opening of predetermined size around this valve-seat. After passing through the orifice 133 the fluid will follow through the spring 137 and openings 203 in the end member 50 to the reservoir 52. If the orifice 133 cannot relieve the pressure exerted upon the fluid in chamber 70, then this excessive fluid pressure will be exerted upon both discs 131 and 135, causing said discs to be pressed upon and flexed about the valve-seat 56 now acting as a pivotal point for said discs, said flexing from normal flat, into dish-shape by said valve-discs being resisted by the spring 137 yieldably urging these discs toward and against the backing plate 120 at a predetermined pressure. Thus it will be seen that these valve-discs 131 and 135, although in themselves not exerting any pressure upon the backing plate 120, are urged upon said backing plate at a predetermined pressure by spring 137, which must yield when a greater fluid pressure is exerted upon the opposite side of the valve-discs, tending to flex them into a dish-shape about the annular valve-seat 56 on the end member 50 and away from the annular valve-seat 126 on the backing plate 120, thereby permitting a restricted flow from the chamber 70 past the radial fingers 121 of the backing plate and through the orifice presented between the flexible disc and the valve-seat 126 through the central openings of the valve-discs 131 and 135 into the reservoir through the opening 203 in the end member 50.

This restriction to the fluid flow from chamber 70 into the recess causes the shock absorber to provide resistance to the approaching movement of the axle toward the body carrying frame 201 of the vehicle and likewise such a resistance would be provided if the frame 201 were moving downwardly toward the axle 202.

The vehicle springs 205 after being compressed will expand and cause a separation between the frame and axle of the vehicle, thus resulting in a movement of the piston 90 toward the upper end of the cylinder. In this instance the entire valve device including backing-plate 120 and valve-discs 131 and 135 together with stud 122 and spring 137 will be lifted bodily, and as a unit upwardly so that the valve-disc 135 is disengaged from the valve-seat 56. Now a substantially unrestricted fluid flow is permitted from the reservoir 52 through the port 60 past the valve-seat 56 and valve-disc 135 into the displacement chamber 70.

In order to resist this separating movement between the frame and axle of the vehicle, the transfer of fluid from chamber 60 through the piston into chamber 70 is restricted. As pressure is exerted upon the fluid in the upper displacement chamber 60 by the upward movement of the piston 90, fluid will be urged through the arcuate slots 87 of the upper disc-valve 85 into the inner, annular row of piston passages 104. An initial flow is established through the orifice 107 in the upper disc-valve 106 consequently providing a restriction to the fluid flow past this valve. If this separating movement between the axle and frame of the vehicle, however, is of such a force as to create an excessive pressure upon the fluid within chamber 60, then orifice 107 could not properly relieve such pressure, in which event the fluid pressure will flex the disc-valves 106 and 109 against the effect of spring 112 to urge them upon seat 103. Now a restricted fluid flow is established through the opening between the disc-valves and valve-seat 103, causing the shock absorber to resist this separating movement of the vehicle frame and axle.

It will be noted that all of the flat, flexible disc-valves of the present device do in themselves exert no appreciable pressure upon their respective valve-seats. More specifically, none of these valve-discs are initially flexed and rigidly secured in such flexed condition to exert, per se, a predetermined pressure upon their valve-seats for resisting fluid flow. In each instance the valve normally and of its own effect merely rests upon its valve-seat. However, an extrinsic element or spring is provided which puts a pressure or load upon each disc-valve, urging said disc-valve upon its seat at a predetermined pressure. In each instance this extrinsic pressure upon the spring does not deform it, but merely holds it in its flat condition against its valve-seat at a predetermined pressure. This is a distinct improvement over the pre-loading of disc-valves by initially flexing them, for experience has taught that a flexible disc-valve will change permanently in response to pressure being exerted thereupon, its characteristics not remaining constant, while on the other hand if a disc-valve is not flexed but maintained in its perfectly normal condition and then urged upon its seat by an extrinsic pressure element, as for instance by a coil spring, the characteristics of the spring and valve effect will remain substantially constant during continuous operation of the shock absorber and application of fluid pressure against the valve. In no instance in applicant's structure does pressure mechanically exerted upon the valves either for clamping them in assembled position or urging them upon their seats at a predetermined pressure cause them to be deformed out of their normal flat condition.

From the aforegoing it will be seen that applicant has provided a shock absorber of the direct-acting type, of simple structure and design, capable of controlling both the approaching and separating movements of the axles and frame of a vehicle.

While the embodiment of the present invention constitutes a preferred form, it is to be understood that other forms might be adopted, all coming within the scope of the claims which follow.

What is claimed is as follows:

1. A hydraulic shock absorber of the direct-acting type comprising, in combination, a cylinder; a piston in said cylinder, said piston having a plurality of fluid passages; a flat and flexible disc-valve engaging each end of the piston normally to close certain of said piston passages, each disc-valve requiring to be flexed to open its respective passages; a resilient disc engaging the one disc-valve to resist its flexing; and means comprising a rigid member urged against the other disc-valve by a coil spring, for resisting the flexing of said other disc-valve.

2. A hydraulic shock absorber of the direct-acting type comprising, in combination, concentrically arranged tubular members providing a working cylinder and a fluid reservoir; a closure member for each end of said tubular members; a mounting ring secured to one closure member; a rod slidably supported in an opening in the other closure member, said rod carrying a piston reciprocable in the cylinder; a recess in the said other closure member, providing a valve-chamber opening into the cylinder; a spring-loaded ball check-valve in said valve chamber; a duct leading from said valve chamber into the opening supporting the piston rod; a recess in the outer surface of the said other closure member in predetermined position relatively to the ball check-valve therein; and a hump in the outer tubular member, predeterminately positioned relatively to the mounting ring thereon, and adapted to engage the recess in the other closure member.

3. A direct-acting hydraulic shock absorber having concentrically spaced tubular members providing a working cylinder and a fluid reservoir, closure members for said tubular members; a piston in the cylinder forming two fluid displacement chambers therein; a check-valve in the one closure member providing for the escape of air from the one displacement chamber; a mounting lug on the other closure member; locating means on the outer tubular member in predetermined position relatively to the mounting lug thereon; and a recess in the one closure member, adapted to receive the locating means on the tubular member.

4. A shock absorber having a cylinder provided with a head member; a rod slidably supported by said head member, said rod having a piston attached thereto which forms a fluid displacement chamber between it and said head member; a recess in the head member opening into the displacement chamber; a counter-bore in the recess of lesser diameter than said recess; and a collar in the recess, providing an orifice and a valve-seat; a spring-loaded ball check-valve normally engaging the valve-seat and permitting fluid flow from but not into the displacement chamber, said ball check-valve being slightly less in diameter than the counter-bore of the recess; and a duct connecting the recess adjacent the point of engagement of the check-valve with its seat, with the opening in the head member in which the piston rod is slidably supported.

5. A hydraulic shock absorber comprising, in combination, a fluid reservoir; a working cylinder connected with the fluid reservoir by a port; a piston in said cylinder; and a valve device for controlling the flow of fluid through said port, said device comprising a flat, flexible disc-member, movable bodily and without flexing, to permit a substantially unrestricted flow of fluid through the port and being adapted to be flexed by fluid pressure to permit a restricted flow of fluid through said port.

6. A hydraulic shock absorber comprising, in combination, a fluid reservoir; a working cylinder connected through a port with the reservoir; an annular valve-seat about said port; and a valve device for controlling the flow of fluid through said port, said device comprising a flat, flexible disc-member movable bodily from said valve-seat to permit a substantially unrestricted flow of fluid through the port into the cylinder and adapted to be pressed upon said valve-seat and flexed into said port by fluid pressure to permit a restricted flow of fluid from said cylinder.

7. A hydraulic shock absorber comprising, in combination, a fluid reservoir; a working cylinder connected with the reservoir by a port; a piston in said cylinder, having valved passages providing for controlled flows of fluid from one side of the piston to the other; an annular ridge about the port providing a valve-seat within the cylinder; and a valve device for controlling fluid flow through said port, and comprising a carrier plate providing an annular valve-seat opposed to the valve-seat in the cylinder; a flat, resilient disc-member urged against the carrier plate by a spring, said disc-member normally resting upon the valve-seat in the cylinder and being movable bodily therefrom to permit a substantially unrestricted fluid flow from the reservoir into the cylinder and being adapted to be flexed from engagement with the valve-seat on the carrier plate while engaging the valve-seat in the cylinder to permit a retricted flow of fluid from the cylinder into the reservoir.

8. A hydraulic shock absorber of the direct-acting type in which concentrically arranged tubular members provide a working cylinder and a fluid reservoir; a piston in said cylinder, having fluid passages and valves for controlling the fluid flow through said passages in opposite directions; a closure member for one end of the cylinder, providing a port connecting the cylinder and reservoir and having an annular ridge providing a valve-seat about the port; and a unitary valve device for controlling the flow of fluid through said port, comprising a rigid backing plate and a flat, flexible disc urged upon said plate by a spring, the disc normally yieldably being urged upon said valve-seat by a separate spring, said valve device being bodily movable to disengage the disc from the valve-seat to permit a substantially unrestricted flow of fluid from the reservoir into the cylinder, the disc being adapted to be pressed upon the valve-seat and flexed in a direction away from the backing plate by fluid pressure to permit a restricted flow of fluid from the cylinder into the reservoir.

9. A hydraulic shock absorber comprising, in combination, a cylinder; a fluid reservoir; a closure member for one end of the cylinder and providing a port between the cylinder and reservoir, said closure member having an annular ridge extending into the cylinder and forming a valve-seat around said port; and a unitary valve device for controlling fluid flow through said port, said device comprising a perforated, rigid backing plate having an annular valve-seat extending toward but smaller in diameter than the valve-seat on the closure member, a flat, flexible disc having a central opening smaller in diameter than the valve-seat on the backing plate and being urged upon said plate by a spring; means yieldably urging the disc into engagement with the valve-seat on the closure member; and means holding the disc to maintain its central opening concentric with the valve-seat on the backing plate.

10. A hydraulic shock absorber comprising, in combination, a fluid reservoir; a working cylinder having a head member providing a port connecting the reservoir and cylinder; a ridge on said head member about said port and extending into the cylinder and providing an annular valve-seat; and a valve device for said port comprising a rigid backing plate having a central stud extending into the port, said plate having radially extending fingers and an annular ridge opposed to but smaller in diameter than the valve-seat on the cylinder head, a flat, flexible disc normally engaging both valve-seats and adapted to be lifted from the cylinder head valve-seat while maintained upon the valve-seat on the backing plate to permit a substantially unrestricted fluid flow from the reservoir into the cylinder and adapted also to be pressed upon and flexed about the cylinder head valve-seat and away from the backing plate valve-seat to permit a restricted fluid flow from the cylinder into the reservoir.

11. A hydraulic shock absorber having a fluid reservoir and cylinder in communication with each other through a port; an annular valve-seat about said port; a piston in said cylinder, provided with oppositely acting fluid flow control devices; and a unitary valve device for controlling the flow of fluid through said port in both directions, said device having a single flexible means movable bodily and without flexing, out of engagement with the annular valve-seat to permit a substantially unrestricted fluid flow through said port and adapted to be flexed centrally and about said valve-seat as a pivot to permit a restricted fluid flow through said port.

12. A hydraulic shock absorber having a fluid reservoir and cylinder in communication with each other through a port; an annular valve-seat about said port; a piston in said cylinder, provided with oppositely acting fluid flow control devices; and a unitary valve device for controlling the flow of fluid through said port in both directions, said device comprising a flat, flexible disc normally resting upon the valve-seat, provided with a central opening and rigidly held against a rigid backing plate by a spring member as the valve-device is bodily lifted from engagement with the valve-seat, said disc being adapted to be centrally flexed against the effect of said spring and about said valve-seat as a pivot to permit a restricted fluid flow through the port in response to predetermined fluid pressure within the cylinder.

EDWIN F. ROSSMAN.
FREDERICK D. FUNSTON.